(12) United States Patent
Ding

(10) Patent No.: US 8,191,073 B2
(45) Date of Patent: May 29, 2012

(54) METHOD AND SYSTEM FOR POLLING NETWORK CONTROLLERS

(75) Inventor: Jianzu Ding, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 1061 days.

(21) Appl. No.: 12/042,285

(22) Filed: Mar. 4, 2008

(65) Prior Publication Data

US 2009/0228895 A1    Sep. 10, 2009

(51) Int. Cl.
G06F 9/46 (2006.01)
G06F 9/44 (2006.01)
G06F 13/24 (2006.01)
G06F 15/16 (2006.01)

(52) U.S. Cl. ........ 718/107; 718/104; 718/102; 717/169; 710/262; 709/201

(58) Field of Classification Search .................. 718/104, 718/102; 717/169; 710/262; 709/201
See application file for complete search history.

(56) References Cited

U.S. PATENT DOCUMENTS

| | | | |
|---|---|---|---|
| 6,633,940 B1 * | 10/2003 | Alasti et al. | 710/262 |
| 7,159,221 B1 * | 1/2007 | Willen et al. | 718/104 |
| 7,516,456 B2 * | 4/2009 | Aguilar et al. | 718/102 |
| 7,653,908 B2 * | 1/2010 | Aguilar et al. | 718/104 |
| 7,698,700 B2 * | 4/2010 | Armstrong et al. | 717/169 |
| 7,707,578 B1 * | 4/2010 | Zedlewski et al. | 718/102 |
| 2004/0107240 A1 * | 6/2004 | Zabarski et al. | 709/201 |

* cited by examiner

*Primary Examiner* — Thomas Lee
*Assistant Examiner* — Aurel Prifti
(74) *Attorney, Agent, or Firm* — Schwegman, Lundberg & Woessner, P.A.

(57) ABSTRACT

Improving the performance of multitasking processors are provided. For example, a subset of M processors within a Symmetric Multi-Processing System (SMP) with N processors is dedicated for a specific task. The M (M>0) of the N processors are dedicate to a task, thus, leaving (N−M) processors for running normal operating system (OS). The processors dedicated to the task may have their interrupt mechanism disabled to avoid interrupt handler switching overhead. Therefore, these processors run in an independent context and can communicate with the normal OS and cooperation with the normal OS to achieve higher network performance.

11 Claims, 8 Drawing Sheets

METHOD AND SYSTEM FOR POLLING NETWORK CONTROLLERS

BACKGROUND

1. Field

The field relates to computer systems and computer networks, and more particularly, to systems and methods for multitasking of processors.

2. Related art

A symmetric multi-processing system (SMP) is widely used in processing systems. A standard operating system (OS) has to handle multiple tasks that need to be performed. An OS can also perform multiple tasks on a set of processors on the SMP. Schedulers are utilized in order for the OS to perform multiple tasks by allowing each task to take turns to be processed by the processors. If a process runs longer than the time specified by the scheduler, an interrupt is sent by the OS to the processors to place that process on hold and allow for another task to be performed. An interrupt handler is used to handle the processes and processors that receive the interrupt. OS task scheduler and hardware interrupt handler mechanism are two major bottlenecks.

In a context switch, the state of each interrupted process must be saved in order for the process to be retrieved by the scheduler when it is its turn to be processed again. For example, this may involve creating and updating switch-frames.

Context switching may be performed by software or hardware; however, no matter how it is implemented, it requires additional resources and increases the load to the system.

Accordingly, improved systems and methods for multitasking of processors would be useful.

SUMMARY

In accordance with some embodiments, a method for improving the performance of a multi-processor system includes providing M processors from N processors to perform a desired task, wherein N is greater than M. The M processors are modified, wherein the modification of the M processors prevents the M processors to perform tasks other than the desired task and the N−M processors continue to perform operating system operations.

In accordance with other embodiments, a method includes disabling interrupt for context switching, providing network interface controllers (NICs), and performing network polling by coupling the NPs and NICs to facilitate communication between the NPs and NICs.

In accordance with other embodiments, a method includes reserving memory in a shared memory, bypassing the network interface controller, and setting up the reserved memory in the shared memory a pseudo network interface controller. In addition, the M processors may always perform polling of the shared memory.

Other aspects and features will be evident from reading the following detailed description of the preferred embodiments, which are intended to illustrate, not limit, the invention.

BRIEF DESCRIPTION OF THE DRAWINGS

The drawings illustrate the design and utility of preferred embodiments, in which similar elements are referred to by common reference numerals. In order to better appreciate how advantages and objects are obtained; a more particular description will be rendered by references to specific embodiments thereof, which are illustrated in the accompanying drawings. Understanding that these drawings depict only typical embodiments and are not therefore to be considered limiting the scope of the invention.

DETAILED DESCRIPTION

Figure 1:
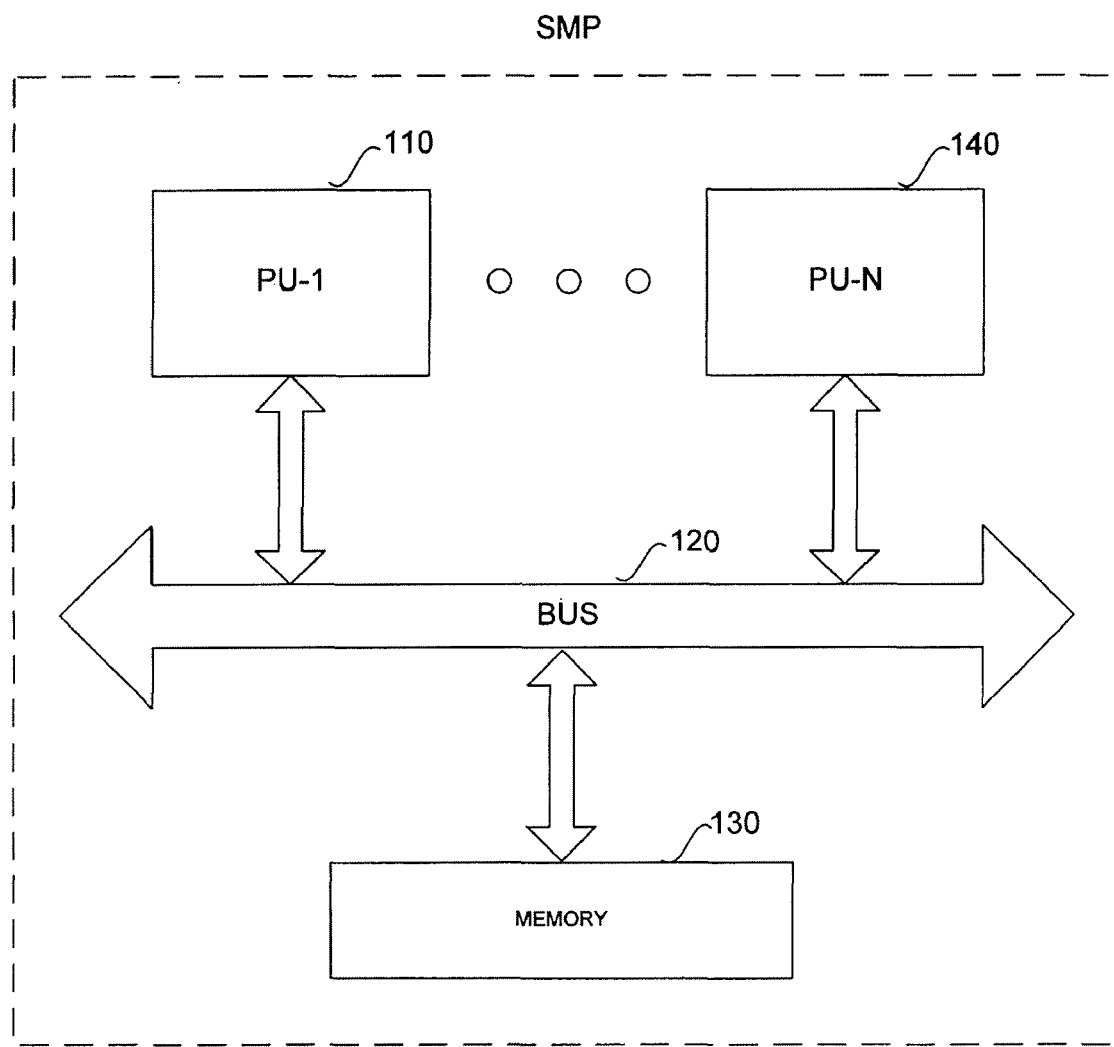
FIG. 1 illustrates a diagram of a symmetric multi-processing system (SMP) system in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments. They are not intended as an exhaustive description or as a limitation on the scope. In addition, an illustrated embodiment needs not have all the aspects or advantages as shown. An aspect or an advantage described in conjunction with a particular embodiment is not necessarily limited to that embodiment and can be practiced in any other embodiments even if not so illustrated.

In some embodiments, a subset of M processors within a Symmetric Multi-Processing System (SMP) with N processors is dedicated for a specific task. The M (M>0) of the N processors are dedicate to a task, thus, leaving (N−M) processors for running normal operating system (OS). The processors dedicated to the task may have their interrupt mechanism disabled to avoid interrupt handler switching overhead. Therefore, these processors run in an independent context and can communicate with the normal OS and cooperation with the normal OS to achieve higher network performance.

OS task scheduler involves another extra overhead that will affect the performance. It is partially caused by the timer interrupt and partially caused by the scheduler software. To dedicate processors to the task, this scheme will overcome these overheads. Since the processors are dedicated, no interrupt and/or task scheduler is needed.

FIG. 1 illustrates a symmetric multi-processing system (SMP) system 100 in accordance with embodiments. The SMP includes a plurality of processing units. In some embodiments, there are N processing units PU-1 to PU-N. The processing units communicate with a shared memory 130 via a bus 120.

In one embodiment, the processing unit (PU-1) 110 is determined to be used to perform a specific task. Interrupt commands from the operating system (OS) that would normally cause that processor to perform other tasks are disabled. The OS as well as the other processing units will continue to assist for the PU-1 to perform the task via the shared memory 130 and the bus 120. Because PU-1 no longer requires any context switching, the bottlenecks for the system 100 are reduced in performing the task.

In another embodiment, a plurality of processing units less than the total number of available processing units (PU-N) 140 may be used for dedicating them to perform the desired task. At least one processing unit needs to be available for the OS to perform all the required functions of the OS. The rest of processors, up to N−1 may be used for the desired task.

In a further embodiment, a plurality of task maybe allowed to be performed by the processing unit 110. Interrupts maybe enabled and/or disabled in order for the processing unit to be dedicated to the desired tasks.

Figure 2:
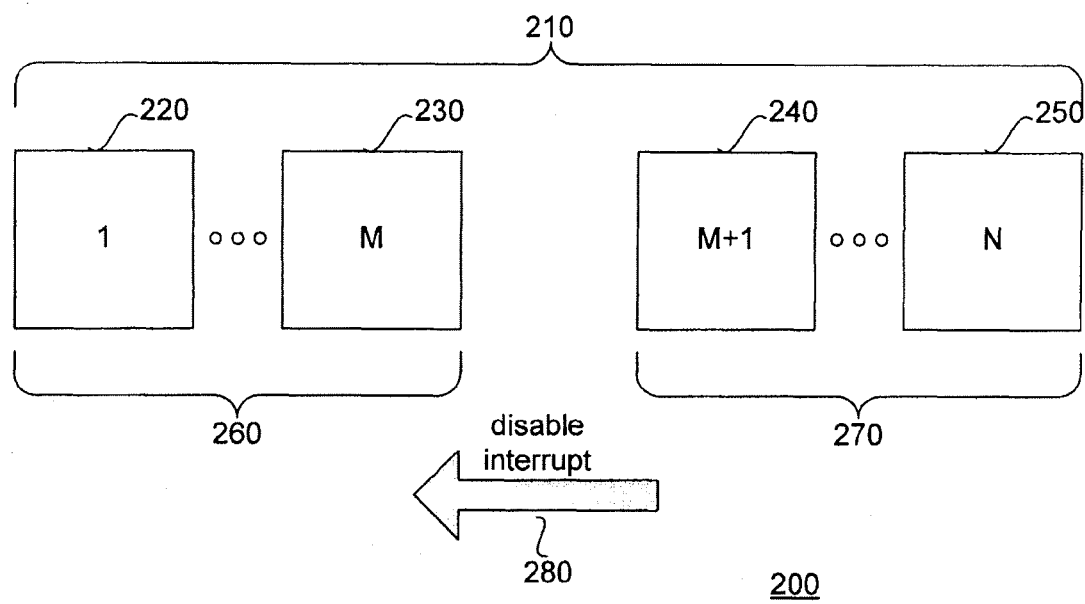
FIG. 2 illustrates a diagram of dedicating a plurality of processors for polling in accordance with some embodiments.

FIG. 2 illustrates a diagram 200 showing dedicating a plurality of processors for polling in accordance with some embodiments. In some embodiments, there are N processors 210. M processors 260 are dedicated for a specialized task such as network polling, content processing, security, or any operations that are performed by the OS. M processors include a first processor 220 to the Mth processor 230. In addition, N−M processors are used for OS operations 270. For example, the M+1 processor 240 to the Nth processor 250 maybe used by the OS freely for any tasks that are required for the proper functioning of the system. Proper functioning includes support for process management, memory management, I/O and file, networking, security, etc. In some embodiments, the processors 270 disable the interrupts 280 for the M processors. In other embodiments, the interrupts for M processors are disabled during the initialization process of the SMP. Any process to disable the interrupts to the M processors may be used.

Figure 3:
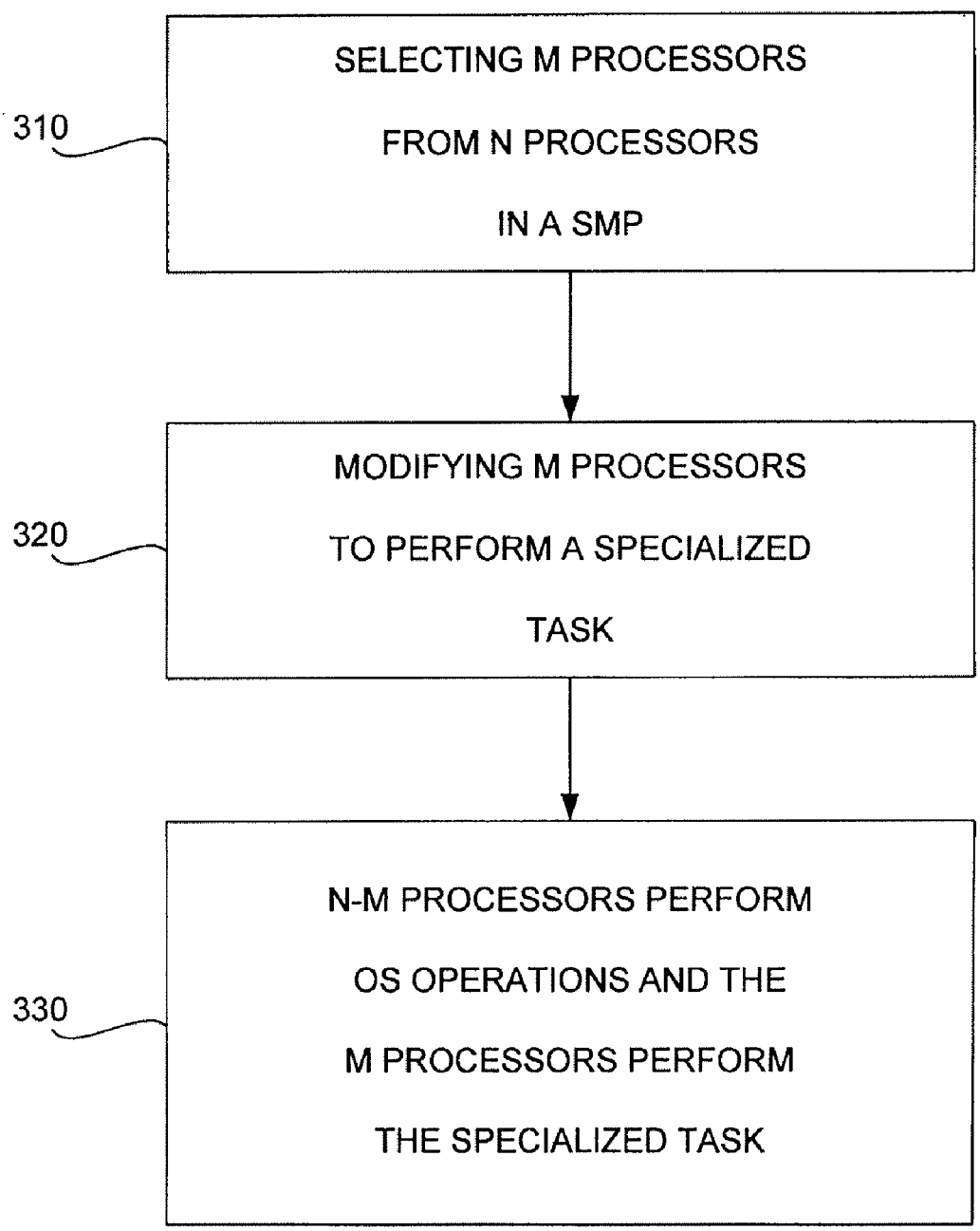
FIG. 3 is a flow chart showing a process for determining the specialized processors according to some embodiments.

FIG. 3 is a flow chart illustrating a process 300 for determining the specialized processor(s) according to an embodiment. In some embodiments, the processor(s) may be the M processors 260 as described in FIG. 2.

In 310, M processors are selected from N total processors in a SMP. Depending on the task that needs to be done, any possible methods to determine the number M processors may be used. For example, an implementer may measure the system performance under a typical load, and dynamically adjust the M/N ratio until the optimal performance value is achieved.

In 320, the selected processors are modified to perform a specialized function. In some embodiments, the modification is achieved by disabling interrupts from the OS. Any modification process may be used. In other embodiments, the specialized function includes network polling. Another function may be content processing. Any functions that may be performed by the OS may be treated as a specialized function.

In 330, N−M processors still perform OS operations; however, the M processor(s) now performs the specialized function.

Figure 4:
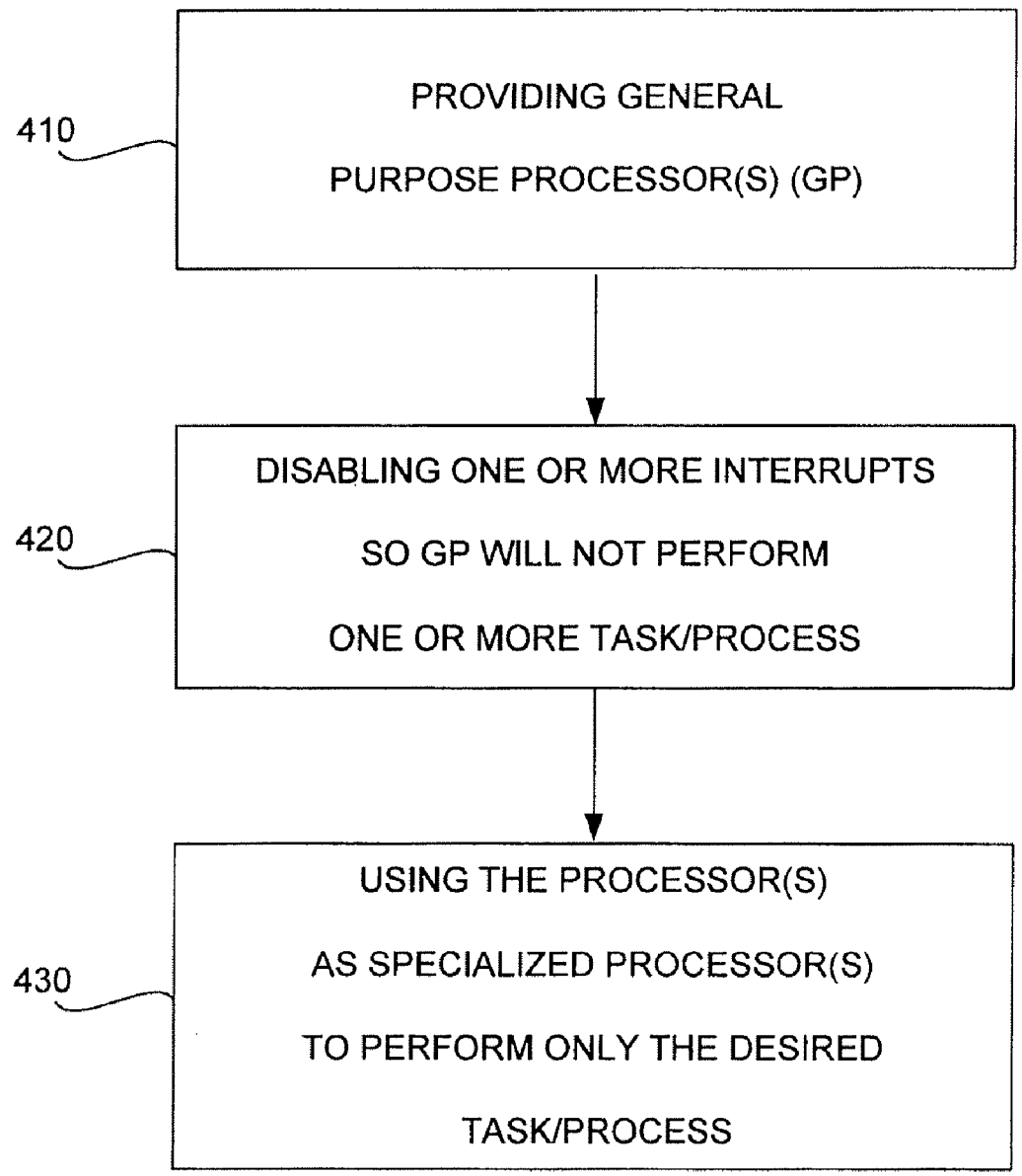
FIG. 4 is a flow chart illustrating a process for modifying the general-purpose processors into specialized processors according to some embodiments.

FIG. 4 is a flow chart illustrating a process 400 for modifying the general-purpose processor(s) into specialized processors according to some embodiments.

In 410, one or more general-purpose processor is provided. In some embodiments, one processor from a plurality of processors of the SMP is dedicated to a particular task or process. In other embodiments, more than one processor is dedicated to the task or process as described in FIG. 3. Any number of processors may be dedicated as desired.

In 420, interrupts to the dedicated processor or processors are disabled. Because the interrupt is disabled, the dedicated processor will not perform context switching. The dedicated processor will continue doing the designated task and/or process. The disabling of the interrupt may be performed by any conventional methods and is well known in the art. In some embodiments, the disabling is performed during initialization. In other embodiments, the disabling is done when the specialization is required. In further embodiments, the disabling may be undone in order to return the SMP to a general state. The disabling process may be provided at any desired time.

In 430, after the interrupts have been disabled, the processor or processors can only perform the desired task and cannot switch to a different task.

Figure 5:
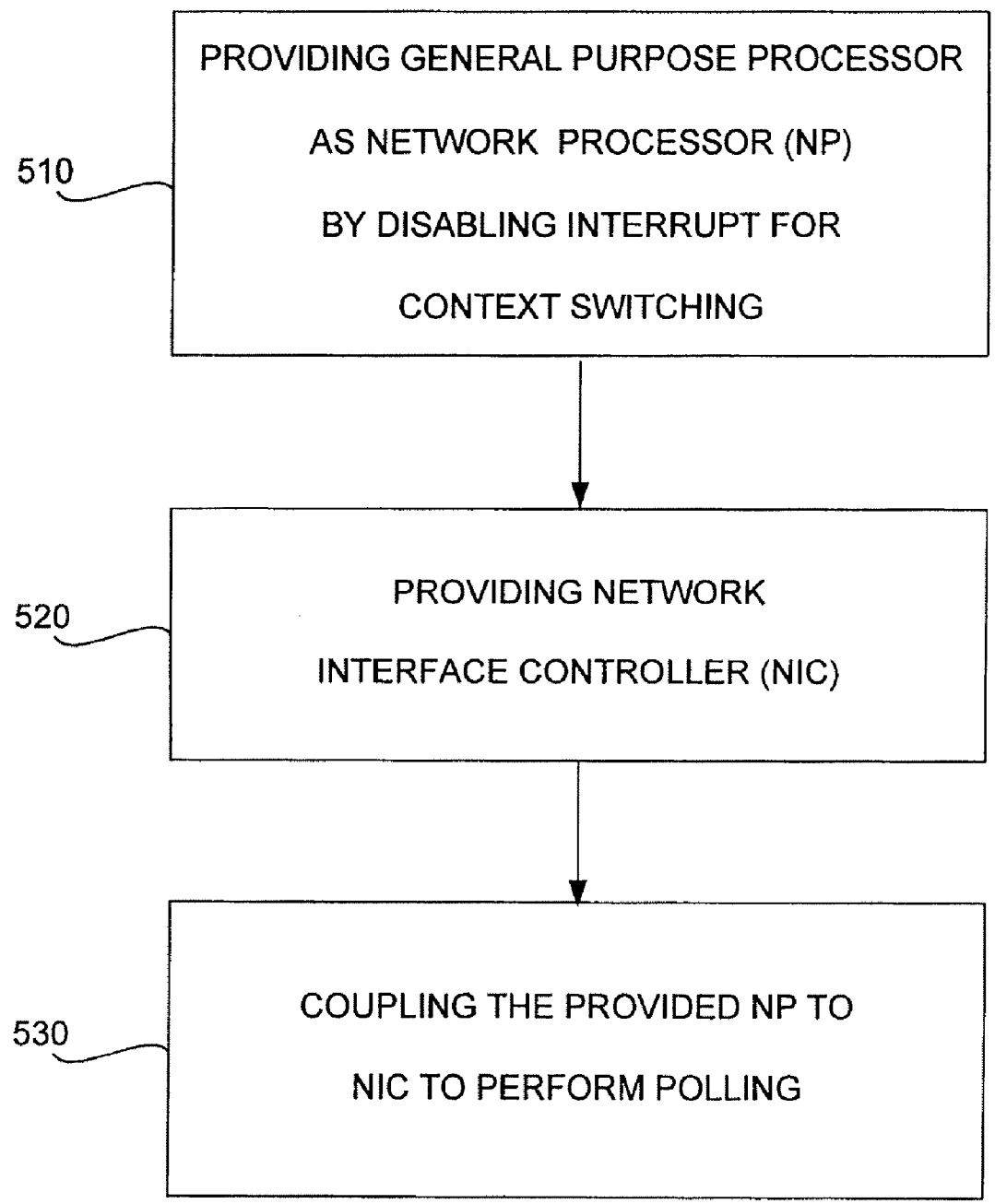
FIG. 5 is a flow chart illustrating a process for providing processors to perform polling according to some embodiments.

FIG. 5 is a flow chart illustrating a process 500 for providing processor(s) to perform polling according to some embodiments.

In 510, a general-purpose processor (GP) is provided and functions as a network processor (NP). The context switching for the GP is turned off by disabling the interrupt for context switching at the GP. As a result, the task for that processor may be the one that it will do until it is finished. In some embodiments, if the processor is a NP, then it performs tasks including polling; therefore, the processor performs polling until that task is finished.

In 520, a network interface controller (NIC) needs to be provided for the NP in order for the network polling to function properly. In some embodiments, the NIC of the system has to be by-passed and a pseudo NIC has to be provided for this scheme to properly function. This is because the NIC of the system is under the control of the system OS and functions with context switching. Therefore, a pseudo NIC that performs the functions of the NIC without context switching is required. In some embodiments, this pseudo NIC is achieved with the help of the OS and other GP's. For example, in the shared memory 130, a polling table, routing table, network packets, etc. may be stored to assist the NP and the pseudo NIC in network polling. Additional examples for this scheme are also illustrates in FIGS. 6 and 7.

In 530, the NP and the NIC are communicably coupled together to perform polling. In some embodiments, additional packet information is stored in shared memory to assist in polling. Some packet information may include address headers, error correction, routing information, and any information that may be required for successful transmission of the packet. In other embodiments, the OS and GP may also assist by, for example, setting up the polling table, storing the received one or more packets, etc.

Figure 6:
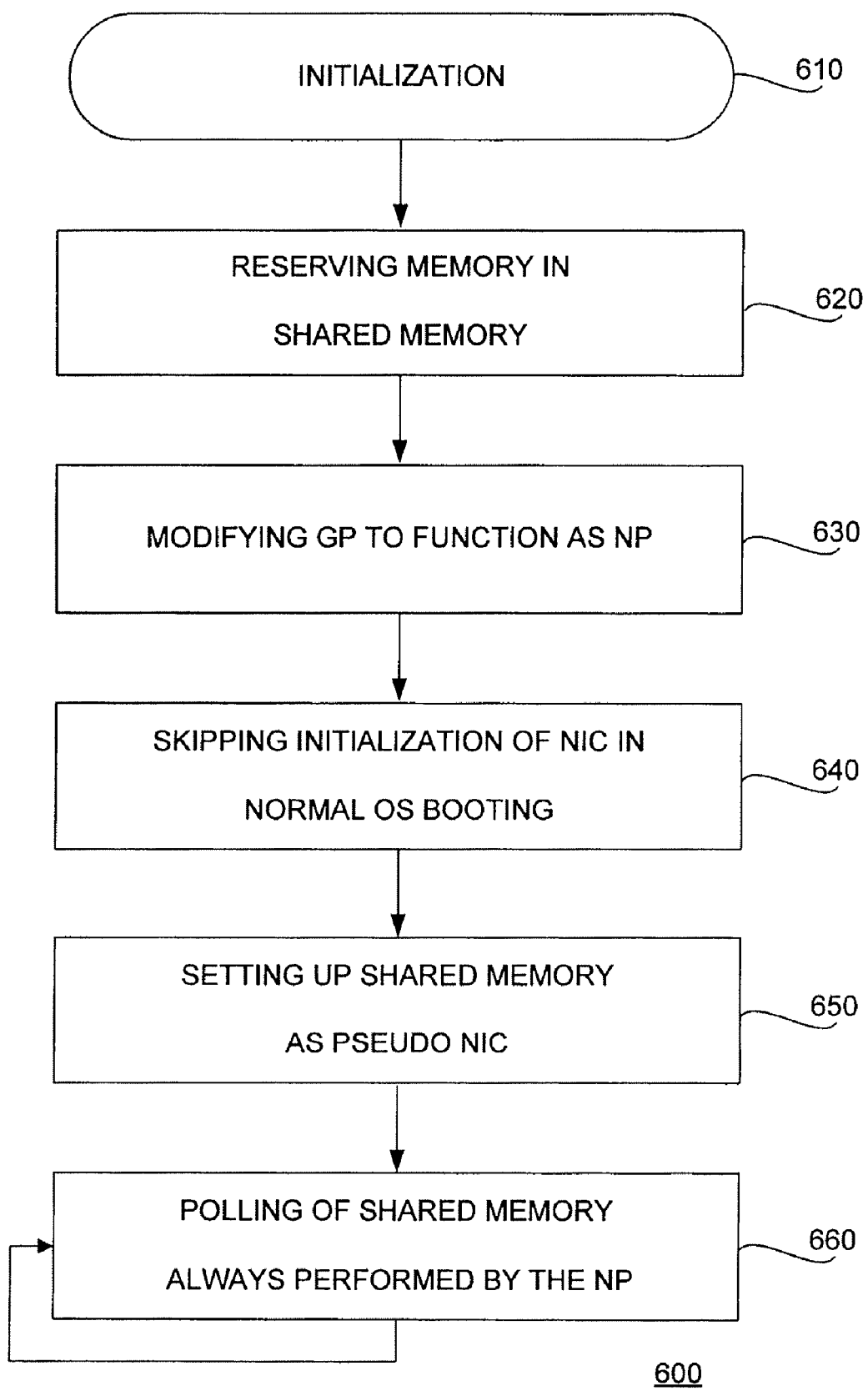
FIG. 6 is a flow chart illustrating a process for providing processors to perform polling according to some embodiments.

FIG. 6 is a flow chart illustrating a process 600 for providing processors to perform polling according to some embodiments. This process sets up the GP as NP at boot-up of the system.

In 610, the system is initialized. Initialization usually involves the starting of the system. In some embodiments of a SMP system, there are N processors where N is an integer greater than 1. The processors are all connected to one or more buses. There is also a shared memory connected to the one or more buses that the processors will share. In other embodiments, the system is a 2-CPU SMP Linux system with 2 G of RAM. Any computer system have multiple processors that performs multitasking may be initialized and benefit from process 600.

In 620, during the initialization process, a portion of the memory in the shared memory is reserve. Depending on how much traffic is expected to be processed, any amount of memory may be reserved. However, there should still be enough shared memory for the other processors and OS to use. In some embodiments, 512M of RAM are reserved before normal OS RAM page initialization. Therefore, the 512M RAM works as a shared memory for normal OS and polling task.

In 630, a CPU is modified to perform the functions of the NP. A CPU is modified when it no longer functions as a general purpose processor but only for dedicated tasks as a specialized processor. Any process may be used to determine how and when the CPU needs to be modified. In some other embodiments, more then 1 CPU may be modified to perform the functions of the NP.

In 640, the initialization of the NIC is skipped during normal OS booting; thus, bypassing the NIC. The NIC needs to be bypassed because it disrupts the function of the NP when the NIC attempts to assert context switching interrupt. In some embodiments, two-selected NICs initializations are skipped in normal OS booting.

In 650, the shared memory is set up as pseudo NIC. In some embodiments, the pseudo NIC is initialized to connect to the NP context with normal OS context via the reserved RAM. Normal OS prepares necessary tables, such as polling tables, routing tables, etc., for polling task as well as any additional components, such as memory, interface, etc., that it needs to function. The tables and components required for network polling is well known in the art. The polling task can process the network packet based on the settings in the tables. In other embodiments, the setup of the pseudo NIC may be accomplished by instructions provided by other hardware, software or users.

In 660, the CPU functions as NP. In some embodiments, the NP falls in an infinite loop to poll the two selected NICs and process all the packets received. No interrupts will disrupt the CPU in this context.

Figure 7:
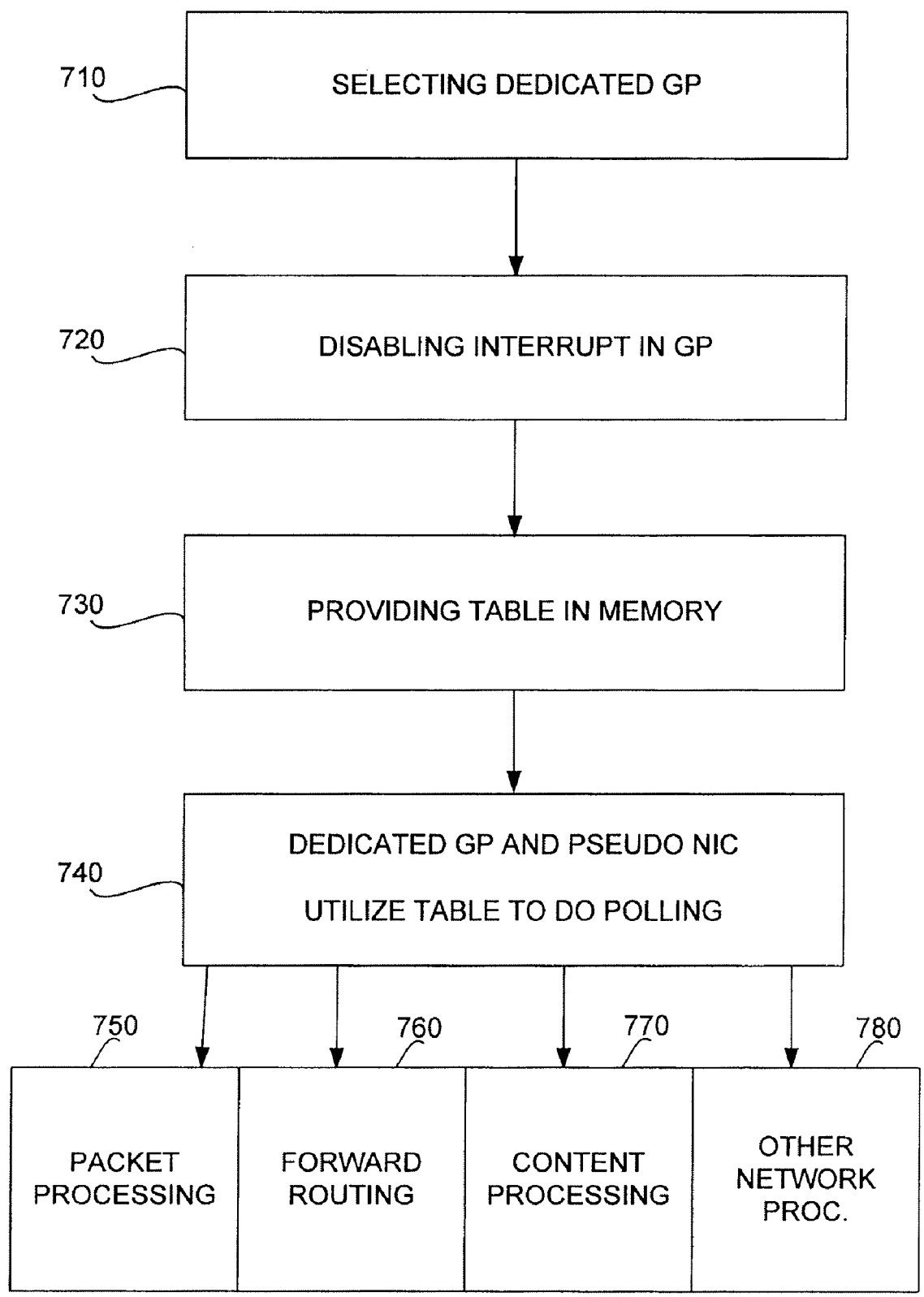
FIG. 7 is a flow chart illustrating a process for providing processors to perform polling according to some embodiments.

FIG. 7 is a flow chart illustrating a process 700 for providing processor(s) to perform polling according to some embodiments.

In 710, a CPU is selected as a dedicated CPU to perform polling. In some other embodiments, more then 1 CPU is dedicated.

In 720, interrupt that are sent to the CPU by the OS are disabled in the CPU. The dedicated CPU may perform any tasks without being interrupted due to context switching. In some embodiments, the OS is notified that the CPU is no longer available for context switching.

In 730, the OS provides tables in memory for the CPU to perform polling. The memory thus functions as a pseudo NIC. In one embodiment, the tables include inbound and outbound queues. The incoming packets are stored in the inbound queue and outgoing packets are stored in the outbound queue. In another embodiment, the table may include mapping of the packets between the inbound queue with the outbound queue. Some strategies for mapping include first-in first-out (FIFO), output order by size of the packet, priorities, etc. In another embodiment. Any conventional process of using tables for polling may be used.

In 740, the dedicated CPU and pseudo NIC are communicatively connected to perform network polling for the system without being interrupted due to context switching. In some embodiments, the polling task include one or more of the following subtasks such as packet processing 750, packet forwarding and/or routing 760 including sending packets from/to network controllers, content processing of the packets 770, and other network processing 780.

Each component used for context switching increases the overhead of the system. OS task scheduler involves another extra overhead that will affect the network performance. It is partially caused by the timer interrupt and partially caused by the scheduler software. For example, to dedicate processors to the network polling task, this scheme will overcome this overhead as well as others. Since the processors are dedicated, no interrupt and/or task scheduler is needed.

Thus, cost to overhead for the system is reduced. For example, a Intel® Pentium® 4, context switching is about 1000 cycles. By removing the context switching, the performance is improved depending on the processes that are running. On average, the performance should at least double. There should be a minimum improvement of 5% to a maximum improvement of 200% depending on the system and the processes running.

Those skilled in the art understand that any or all of the functions performed to improve multitasking of processors can be implemented using software, hardware, or combination thereof. Alternatively, a computer system may also be used to implement the method to perform the same or similar functions described herein.

Figure 8:
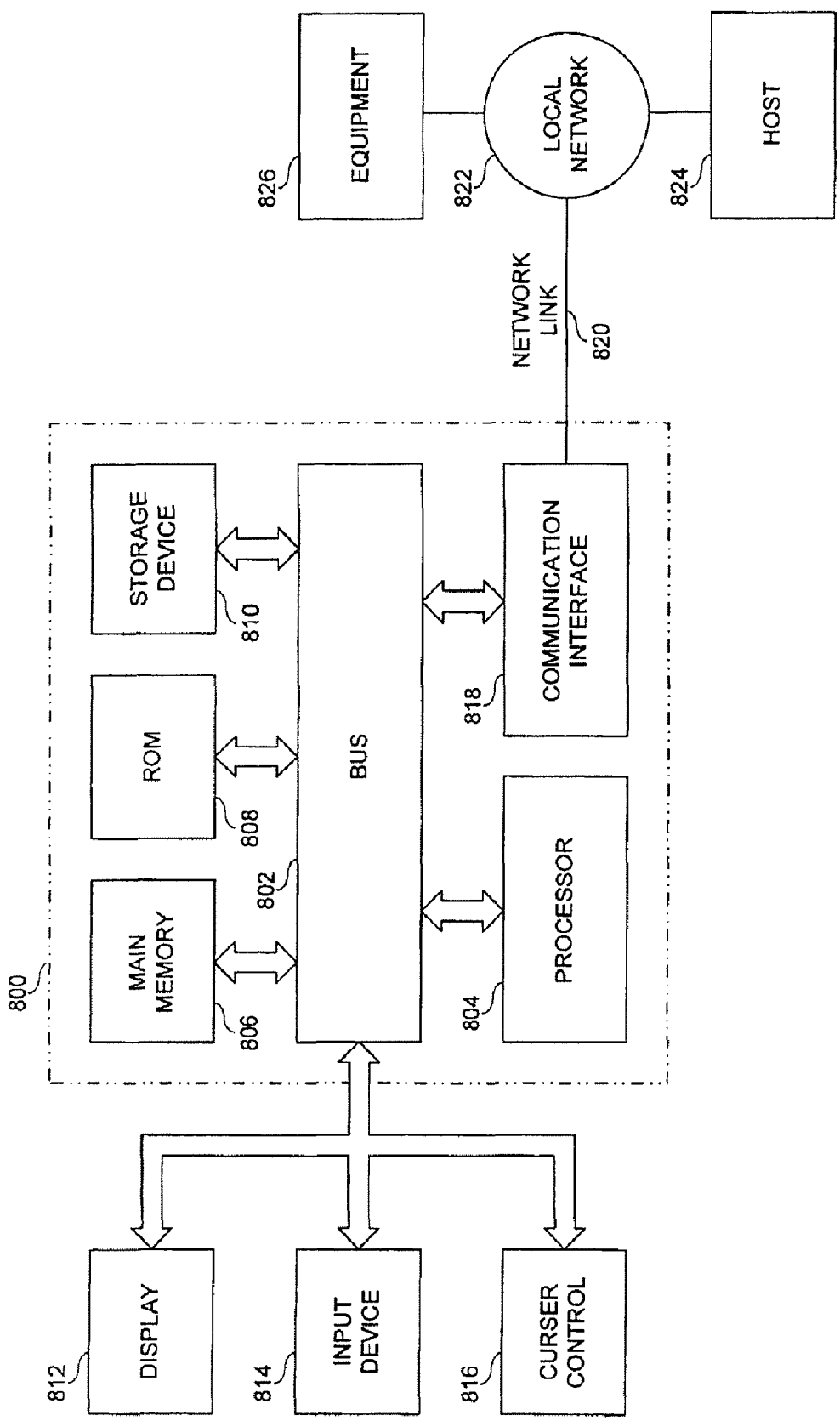
FIG. 8 illustrates a diagram of a computer hardware system with which embodiments can be implemented.

FIG. 8 is a block diagram that illustrates an embodiment of a computer system 800 upon which embodiments may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 may further include a read only memory (ROM) 808 or other static storage device coupled to bus 802 for storing static information and instructions for processor 804. A data storage device 810, such as a magnetic disk or optical disk, is provided and coupled to bus 802 for storing information and instructions.

Computer system 800 may be coupled via bus 802 to a display 812, such as a cathode ray tube (CRT) or a liquid crystal display (LCD), for displaying information to a user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

According to some embodiments, such use may be provided by computer system 800 in response to processor 804 executing one or more sequences of one or more instructions contained in the main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry data streams representing various types of information.

Network link 820 typically provides data communication through one or more networks to other devices. For example, network link 820 may provide a connection through local network 822 to a host computer 824, or to equipment 826. The data streams transported over the network link 820 can comprise electrical, electromagnetic or optical signals. The signals through the various networks and the signals on network link 820 and through communication interface 818, which carry data to and from computer system 800, are exemplary forms of carrier waves transporting the information. Computer system 800 can send messages and receive data, including program code, through the network(s), network link 820, and communication interface 818. Although one network link 820 is shown, in alternative embodiments, communication interface 818 can provide coupling to a plurality of network links, each of which connected to one or more local networks. In some embodiments, computer system 800 may receive data from one network, and transmit the data to another network. Computer system 800 may process and/or modify the data before transmitting it to another network.

Although particular embodiments have been shown and described, it will be understood that it is not intended to limit the present invention to the preferred embodiments, and it will be obvious to those skilled in the art that various changes and modifications may be made without departing from the spirit and scope. The specification and drawings are, accordingly, to be regarded in an illustrative rather than restrictive sense. The present invention is intended to cover alternatives, modifications, and equivalents, which may be included within the spirit and scope of the present invention as defined by the claims.

I claim:

1. A method for improving the performance of a multiprocessor system, the method comprising:
   providing M general-purpose processors from N general-purpose processors to perform a a network polling task, wherein N is greater than M; and
   modifying the M general-purpose processors, wherein the modification of the M general-purpose processors prevents the M general-purpose processors to perform tasks other than the network polling task and the N–M (N minus M) general-purpose processors continue to perform operating system operations;
   wherein the M general-purpose processors are dedicated as network processors (NPs), and the method further comprising:
   bypassing network interface controller (NIC) initialization during normal boot of the operating system;
   with regard to the M general purpose processors, disabling interrupts for context switching;
   reserving memory in a shared memory as a pseudo NIC; and
   performing network polling by coupling the NPs and network interface controllers, via the pseudo NIC, to facilitate communication between the NPs and network interface controllers.

2. The method of claim 1, wherein the modification comprises disabling an interrupt in the M general-purpose processors.

3. The method of claim 2, wherein the interrupt comprises context switching interrupt.

4. The method of claim 1, wherein the act of providing the M general-purpose processors includes obtaining control of the M general-purpose processors such that the M general-purpose processors perform the network polling task.

5. The method of claim 1, wherein the task of polling comprises one or more of subtasks comprising: processing packets, forwarding packets, routing packets, processing content, sending packets to and from network interface controller and processing for other networks.

6. An apparatus for improving the performance of a multiprocessor system, the method comprising:
   means for providing M general-purpose processors from N general-purpose processors to perform a network polling task, wherein N is greater than M; and
   means for modifying the M general-purpose processors, wherein the modification of the M general-purpose processors prevents the M general-purpose processors to perform tasks other than the network polling task and the N–M (N minus M) general-purpose processors continue to perform operating system operations;
   wherein the M general-purpose processors are dedicated as network processors (NPs), and the apparatus further comprising:
   means for bypassing network interface controller (NIC) initialization during normal boot of the operating system;

with regard to the M general purpose processors, means for disabling interrupts for context switching;

means for reserving memory in a shared memory as a pseudo NIC; and means for performing network polling by coupling the NPs and network interface controllers, via the pseudo NIC, to facilitate communication between the NPs and network interface controllers.

7. The apparatus of claim 6, wherein the modification comprises disabling an interrupt in the M general-purpose processors.

8. The apparatus of claim 7, wherein the interrupt comprises context switching interrupt.

9. The apparatus of claim 6, wherein the means for providing the M general-purpose processors include means for obtaining control of the M general-purpose processors such that the M general-purpose processors perform the network polling task.

10. A computer product having a set of instructions stored in a memory device, the execution of which causes a process to be performed, the process comprising:

providing M general-purpose processors from N general-purpose processors to perform a a network polling task, wherein N is greater than M; and modifying the M general-purpose processors, wherein the modification of the M general-purpose processors prevents the M general-purpose processors to perform tasks other than the network polling task and the N–M (N minus M) general-purpose processors continue to perform operating system operations;

wherein the M general-purpose processors are dedicated as network processors (NPs), and the method further comprising:

bypassing network interface controller (NIC) initialization during normal boot of the operating system;

with regard to the M general purpose processors, disabling interrupts for context switching;

reserving memory in a shared memory as a pseudo NIC; and performing network polling by coupling the NPs and network interface controllers, via the pseudo NIC, to facilitate communication between the NPs and network interface controllers.

11. The product of claim 10, further comprising disabling an interrupt in the M general-purpose processors, wherein the interrupt comprises context switching interrupt.

\* \* \* \* \*